(No Model.)
J. C. STURGEON.
BALL AND SOCKET PIPE JOINT.
No. 409,124. Patented Aug. 13, 1889.
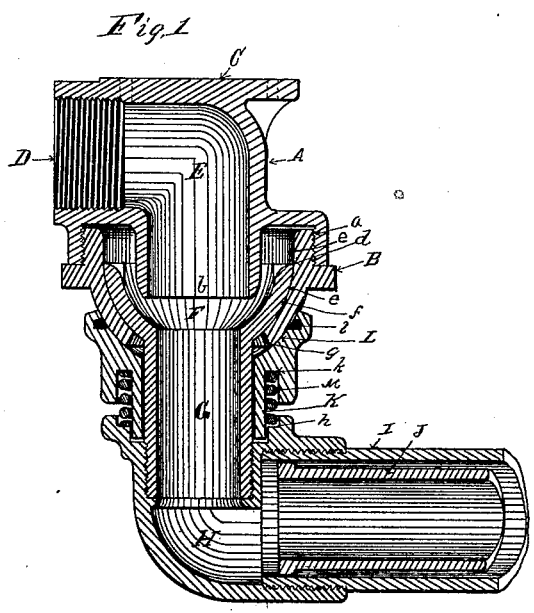
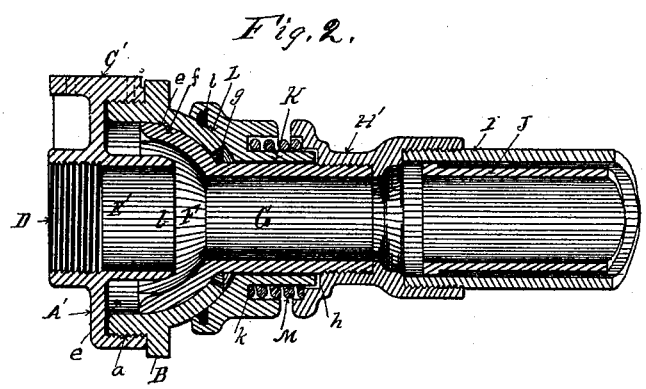
Witnesses.
G. J. Mead,
F. J. Barrett
Inventor.
J. C. Sturgeon

UNITED STATES PATENT OFFICE.

JOHN C. STURGEON, OF ERIE, PENNSYLVANIA, ASSIGNOR OF ONE-FOURTH TO SAMUEL A. DAVENPORT, OF SAME PLACE.

BALL-AND-SOCKET PIPE-JOINT.

SPECIFICATION forming part of Letters Patent No. 409,124, dated August 13, 1889.

Application filed October 1, 1888. Serial No. 286,897. (No model.)

*To all whom it may concern:*

Be it known that I, JOHN C. STURGEON, a citizen of the United States, residing at Erie, in the county of Erie and State of Pennsylvania, have invented certain new and useful Improvements in Ball-and-Socket Pipe-Joints; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in ball-and-socket pipe-joints hereinafter set forth and explained, and illustrated in the accompanying drawings, in which—

Figure 1 shows a vertical central section of a ball-and-socket pipe-joint embodying my invention. Fig. 2 shows a modified form of joint embodying my invention.

Like letters refer to like parts in all the figures.

The objects of my invention are to construct a ball-and-socket pipe-joint for connecting steam-pipes between railway-cars with a spring-actuated shell operating on the outer end of the socket, so as to automatically provide for the expansion and contraction of the operative parts of the joint and take up the ordinary wear thereof, so as to keep it tight under all ordinary conditions without adjustment, and also to so construct the joint as to completely protect it from the dust and other substances injurious thereto.

In the construction of my joint as illustrated in Fig. 1, A is the upper portion of the socket, and B the lower portion thereof, secured together by means of a screw-thread $a$. The upper portion A is provided with a plate C, adapted to be bolted to any suitable support. In one side of the section A is a screw-threaded opening D, adapted to receive a pipe. From the opening D a passage extends inward and downward, terminating in a pipe $b$, which extends downward into the hollow semi-spherical ball F, so as to carry scale or dirt from the pipes down into the hollow semi-spherical ball F below the junction of the upper edge $d$ thereof with the inner surface $e$ of the socket B, so as to prevent such scale or dirt lodging at that point and working into and injuring the joint, the inner surface $e$ of the socket B and the outer surface $f$ of the ball F being ground together and forming a steam and water tight joint. Extending downward from the hollow semi-spherical ball F is a hollow stem G, which is firmly screwed into the elbow H, into the opposite end of which the shell I of an ordinary expansion-joint is secured, so as to form a continuous passage from a pipe secured in the socket at D through the joint and into the portion J of the expansion-joint.

Around the hollow stem G, I place a loose sleeve K, the upper end of which forms a semi-socket L, fitting over the outside of the lower end of the socket B, the socket L operating thereon.

Between a shoulder $k$ on the sleeve K and a shoulder $h$ on the elbow H, I place a spiral spring M, which encircles the sleeve K and operates to retain the bearing-surfaces $e$ and $f$ in close contact, and also to keep the socket L in place against the outer surface of the socket B, and at the same time all of the expansion and contraction, as well as all of the ordinary wear and tear of the working parts of the joint, are automatically adjusted by the operation of the spring M.

The construction and operation and the form of my improved joint shown in Fig. 2 are the same in all respects, except in that the passage E' through the upper section A' of the socket and the passage through the connection H' between the hollow stem G of the ball F and the expansion-joint I J are straight, instead of elbows E and H, as shown in Fig. 1 and hereinbefore described, and further description thereof is therefore deemed unnecessary.

Having thus fully described my invention so as to enable others skilled in the art to which it appertains to make and use the same, what I claim as new, and desire to secure by Letters Patent of the United States, is—

1. The combination, in a flexible ball-and-socket pipe-joint, of a socket a portion of which has parallel hemispherical outer and inner surfaces, and a hollow semi-spherical ball seated and operating on the inner hemispherical surface of said socket, and having a hollow stem projecting out through an opening in the central portion of said hemispherical socket, with a semi-spherical cap having an opening therein fitting loosely over the said stem and operating on the outer hemispherical surface of said socket, and a spring on said stem operating between a collar thereon and the outer end of said socket, adapted to automatically retain the semi-spherical ball on the inner end of the stem in close contact with the inner surface of the socket and the semi-spherical cap in like close contact with the outer surface of the socket, whereby a tight, dust-proof, flexible ball-and-socket joint not affected by the expansion and contraction of the parts thereof is secured, substantially as and for the purpose set forth.

2. The combination, in a ball-and-socket pipe-joint, of a socket a portion of which is hemispherical, a hollow semi-spherical ball having a hollow stem thereon and operating in the hemispherical portion of said socket, and an inlet-pipe projecting down into the chamber in said semi-spherical ball, with a loose socket operating over the stem of said ball and adapted to partially embrace the outer surface of the hemispherical portion of the socket in which said ball operates, and a spiral spring operating between a collar on said socket and a collar on the stem of the ball, substantially as and for the purpose set forth.

3. The combination, in a ball-and-socket pipe-joint, of a hemispherical socket portion B and a hollow semi-spherical ball F, having a hollow stem G thereon and operating in said socket-section B, with a loose sleeve K, covering the hollow ball-stem G outside of the socket B, and having a socket L thereon partially embracing and operating against the outside of the socket B, and a spiral spring M, operating between a collar on said sleeve-socket and a collar on the outer end of the stem G, substantially as and for the purpose set forth.

4. The combination, in a ball-and-socket pipe-joint, of the right-angled inlet-pipe E, having an extension $b$ reaching down into the hollow ball F, and the socket-section B, with the half-ball F operating in said socket, the loose sleeve-socket K, operating on the ball-sleeve G and against the outside of the socket-section B, the elbow H, and the spring operating between the shoulder K on said socket-sleeve and the shoulder $h$ on said elbow H, substantially as and for the purpose set forth.

In testimony whereof I affix my signature in presence of two witnesses.

JOHN C. STURGEON.

Witnesses:
N. J. CLARK,
H. J. CURTZE.